United States Patent [19]
Wyard

[11] 3,990,586
[45] Nov. 9, 1976

[54] ARTICLE DISPENSING APPARATUS

[75] Inventor: Walter Harvie Wyard, Worcester, England

[73] Assignee: Metal Box Limited, Reading, England

[22] Filed: Mar. 21, 1975

[21] Appl. No.: 569,617

[30] Foreign Application Priority Data
Mar. 21, 1974 United Kingdom............... 12556/74

[52] U.S. Cl. .............................. 214/6 DK; 53/313; 198/530; 214/6 M
[51] Int. Cl.² ........................................ B65G 57/00
[58] Field of Search................ 214/6 DK, 6 F, 6 M; 53/313, 314, 315, 316; 271/189, 192; 198/35, 26; 29/203 L, 203 S

[56] References Cited
UNITED STATES PATENTS

| | | | |
|---|---|---|---|
| 2,154,172 | 4/1939 | Lathrop | 53/313 |
| 2,355,479 | 8/1944 | Stover | 53/313 |
| 3,099,120 | 7/1963 | Bruun | 53/313 |

FOREIGN PATENTS OR APPLICATIONS
727,764  4/1955  United Kingdom................... 53/313

*Primary Examiner*—Robert J. Spar
*Assistant Examiner*—Ross Weaver
*Attorney, Agent, or Firm*—Diller, Brown, Ramik & Wight

[57] ABSTRACT

An apparatus is described for applying leverlids to filled paint cans so that a later machine may fit the lids onto the cans by downward pressure. The apparatus has an inclined chute onto which the lids are fed and which is arranged to discharge the lids accurately onto paint cans moving on a horizontal conveyor beneath the apparatus. To control the movement of the lids onto the cans two release members rotatable about generally vertical axes are mounted on either side of the chute outlet so as to obstruct the outlet until such time as a paint can on the conveyor frees the release members for movement and thereafter pushes the release members aside.

7 Claims, 5 Drawing Figures

ARTICLE DISPENSING APPARATUS

This invention relates to article dispensing apparatus. In particular, the invention relates to an apparatus for the superimposing of articles one at a time upon other articles with which the dispensed articles are to be associated in a finished product and which are caused to move in succession along a predetermined path past the apparatus. In one application of the invention lids are dispensed on to filled paint cans moving in succession along a conveyor to that a machine fed by the conveyor can subsequently fit the lids on the paint cans by merely applying vertical pressure to the lids.

In accordance with the present invention from one aspect there is provided apparatus for superimposing a first article upon a second article moving along a predetermined path past the apparatus, comprising a body defining a holding station for a said first article and an outlet from the said station, and at least one release member moveable on the body between a first position in which it prevents a said first article at the holding station from leaving the holding station via the outlet and a second position in which it allows the said first article to leave the holding station under gravity, the release member being biassed into its first said position and there being additionally provided a catch arrangement to lock the release member in its said first position until such time as engagement by a said second article releases the catch arrangement and thereafter forces the release member to its second position.

Preferably the catch means comprises a catch member carried by the release member, and the said engagement of the catch means by the said second article occurs at the said catch member and is effective both to release the catch means and subsequently to force the release member to its second position.

In order that the invention may be fully understood an embodiment of the invention and a modification thereof will now be described by way of example, with reference to the accompanying drawings, in which:

FIG. 1 diagrammatically illustrates the operation of the apparatus embodying the invention;

Figure 1:
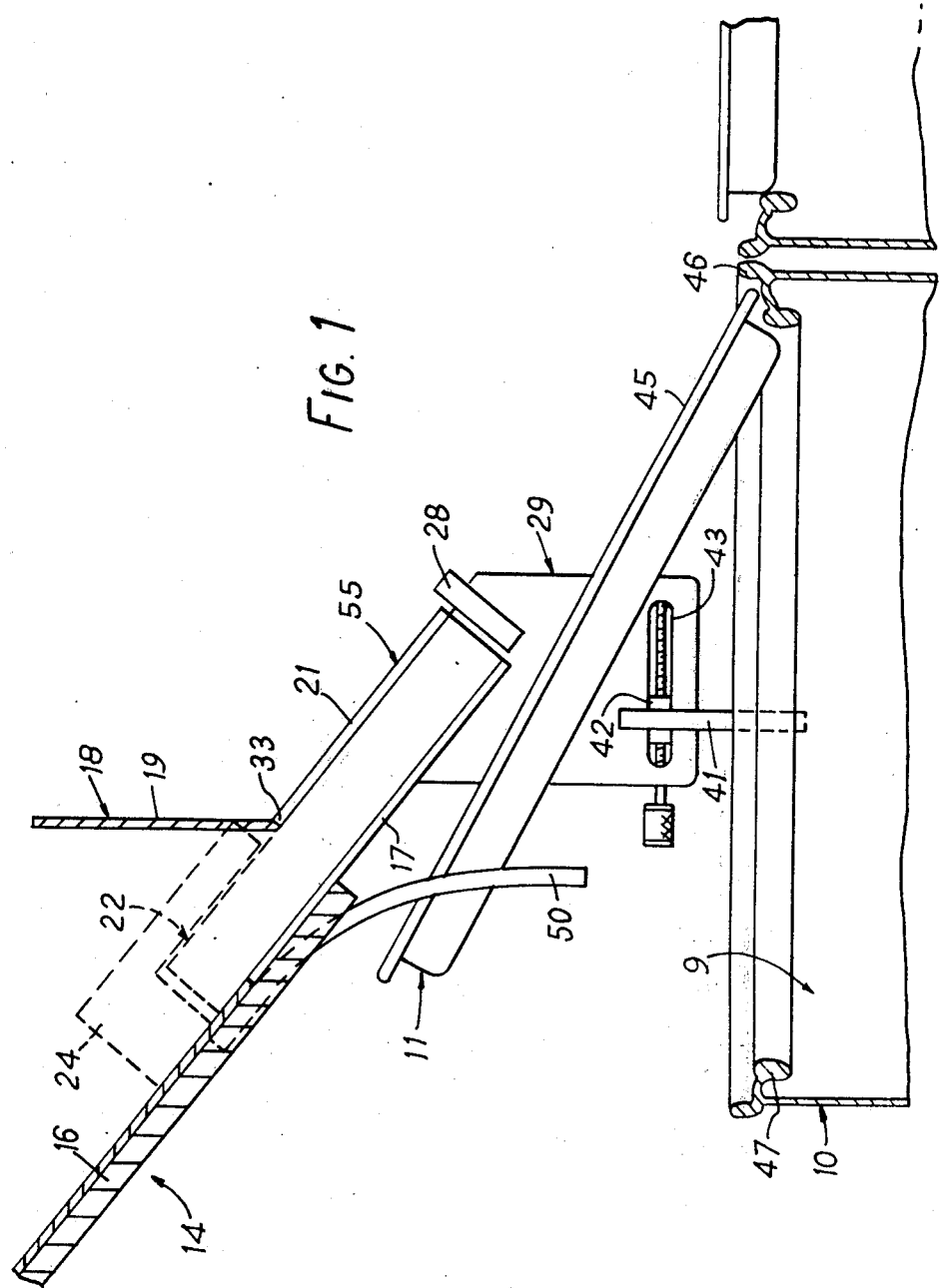
Figure 2:
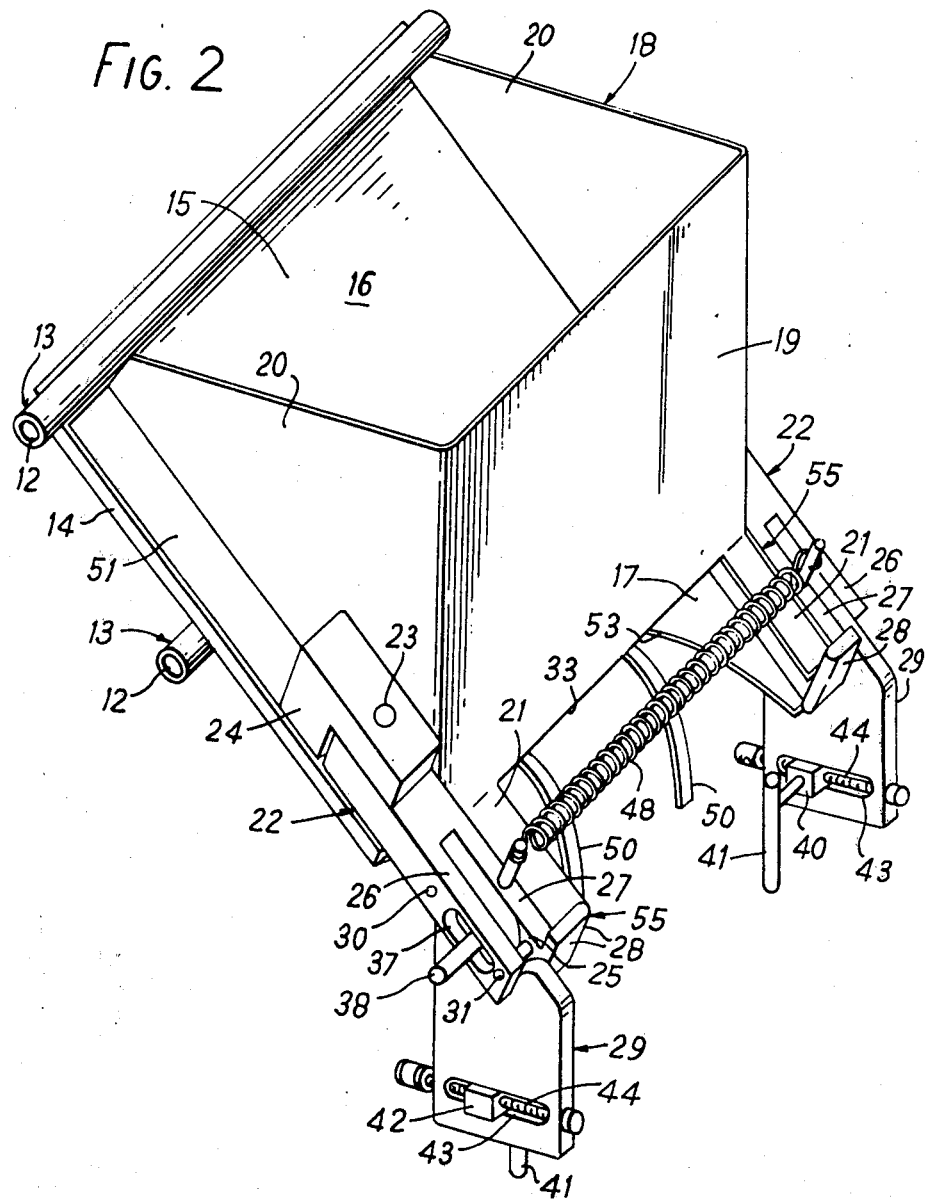
FIG. 2 is a perspective view of the apparatus as seen from above.
Figure 3:
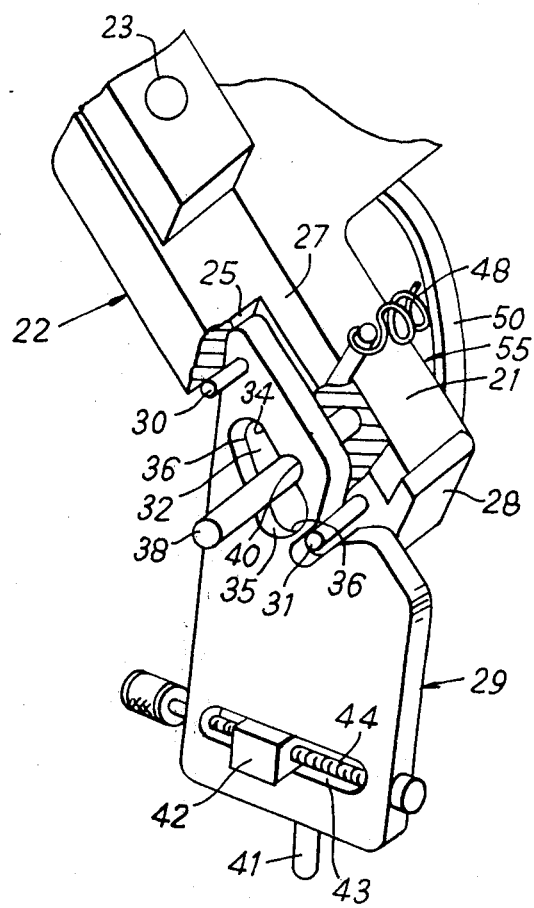
FIG. 3 is a view similar to FIG. 2 of part of the apparatus, when cut away locally to reveal internal structure.

Referring now to FIGS. 1 to 3 of the drawings, the first apparatus embodying the invention is arranged above a horizontal conveyor belt (not shown) on which filled by lidless lever lid paint cans 10 (FIG. 1) are carried in succession, from left to right as shown, with a random spacing which may vary from zero upwards. As will later become apparent, the apparatus serves for feeding lids 11 individually on to the paint cans with a sufficient accuracy for a later machine (not shown), to close the cans merely by applying vertical pressure to force the lids into the corresponding opening 9 in the top of the cans. It will be appreciated that a considerable degree of accuracy of lid location is required of the apparatus for this later machine to be effective.

As can be seen in detail in FIGS. 2 and 3, the apparatus is secured in its required position above the conveyor belt by suitable engagement with screw threads 12 formed on each end of support rods 13.

The support rods are mounted on the underside of an inclined plate member 14 which in turn is arranged to support a slide member 16 in the form of a plane sheet arranged for its upper surface 15 to serve as a sliding surface for individual lids 11 as will later become apparent.

The plate member 14 is rectangular. The slide member 16 projects beyond the bottom edge of the plate member and has its projecting portion centrally cut away at a semi-circular cut-out 53 so as to form two laterally spaced and downwardly projecting finger portions 17.

A feed member 18 fabricated from sheet material is mounted generally above the plate member 14 and the slide member 16. The feed member has a generally plane and vertical front portion 19 and, at either side of the portion 19, generally plane and vertical side portions 20 which extend downwardly to the slide member 16 so as to provide lateral guidance for a lid 11 on the surface 15. It will be seen that the member 16 and the portions 19 and 20 of the member 18 form an open-topped hopper by which lids 11 can be automatically or manually fed one-by-one onto the surface 15.

The feed member 18 also has integral finger portions 21 which extend downwardly from the lower edge 33 of the front portion 19, in a plane which includes the edge 33 and which lies above, and in parallel with, the part of the surface 15 provided by the finger portions 17. The common plane of the finger portions 21, and the surface 15 are separated by a spacing which is somewhat greater than the depth of a lid 11 to be dispensed. Thus the finger portions 17 and 21 define the top and bottom of an inclined output channel from the hopper provided as described above, the channel being laterally defined on either side of the apparatus by parts 54 (FIG. 3) of the side portions 20 which depend from the finger portions 21.

It will be understood from the foregoing and from the drawings that on either side of the apparatus the items 17, 21 and 54 in combination form two hollow and inwardly open depending fingers each of which is spaced from the respective side edge of the apparatus. In the drawings these fingers are generally denoted by the reference numeral 55.

As can clearly be seen in FIG. 1, two elongate release members 22 are individually disposed one on either side of the apparatus so as at their bottom ends to overhang the recesses formed alongside the fingers 55. The release members are journalled at their top ends for pivotal movement about axes perpendicular to the plate member 14; they are mounted on spindles 23 which extend between the plate member 14 at their bottom ends and, at their top ends, respective cranked members 24 which are suitably secured to the plate member 14. A weak tension spring 48 biasses the release members towards one another.

The feed member 18 is suitably attached to the plate member 14 by means of turned out integral flanges 51 which extend along the bottom edges of the side portions 20 excepting the parts 54 thereof. Although not apparent from the drawings it is to be understood that the flanges 51 are bolted to the plate member 14. Conventionally the slide member 16 is secured in position by means of its side edges which are sandwiched between the flanges and the underlying parts of the plate member 14. In a modification, however, the slide member 16 is located in position by means of studs engaging or, alternatively, carried by the plate member beneath the surface 15.

The release members 22 are bifurcated, their overhanging lower ends being formed with vertical slots 25 between outer and inner parallel arms 26, 27. The inner arms 27 carry integral lid-retaining lugs 28 which normally project inwardly towards one another below the bottom ends of the fingers 55 sufficiently to prevent a lid from leaving the apparatus as will later be described.

Two catch members 29 are individually mounted for vertical pivotal movement within the slots 25 about horizontal spindles 30 which extend between the pairs of arms 26, 27 adjacent the closed upper ends of the slots. Stop pins 31 extend between the arms 26, 27 for providing a limit to upward (i.e. anticlockwise) pivotal movement of the catch members about the spindles 30.

As can particularly be seen in FIG. 3, the catch members 29 are formed with elongated apertures 32 having straight and generally parallel upper and lower sides 34, 35 and rounded ends 36 therebetween; the major axes of the apertures are aligned with the release member 22. Apertures 37 similar to the apertures 32 are formed in the arms 26, 27 of the release members in horizontal alignment with one another and with the apertures 32. Horizontal latching studs 38 are carried from the parts 54 of the feed member 18 at their inner ends so as to project laterally and outwardly of the apparatus through the associated apertures 32 and 37.

Part way along their lengths the upper sides 34 of the apertures 32 are formed with part-cylindrical notches 40 of the same radius of curvature as the latching studs 38. The major parts of the catch members 29 are located below the release members 22, the catch members being so disposed that their centres of gravity are forward of the spindles 30 in relation to the movement of lids 11 through the apparatus. The catch members are therefore biassed by gravity in a clockwise sense about the spindles 30, so as to engage the latching studs 38 at their notches 40. Under such circumstances the release members 22 are held in position such that their retaining lugs 28, as previously described, obturate the channel defined by the fingers 55 sufficiently to prevent a lid 11 from leaving the apparatus.

In use of the apparatus a lid 11 is placed or dropped manually or automatically onto the surface 15 with its lower side downmost, and slides down the surface 15 until its is prevented from further movement by the retaining lugs 28. The catch members 29 are provided with downwardly extending trip pins 41 so diposed as to contact a can 10 passing along the conveyor belt beneath the apparatus at the top peripheral edge of the can, at a relative spacing considerably smaller than the can diameter.

Thus a can 10 moving along the conveyor will, by causing the catch members 29 to pivot in an anticlockwise direction into contact with the stop pins 31, lift the catch members sufficiently for the studs 38 to leave the notches 40 and thereby release the release members 22 for pivotal movement on their spindles 23, but insufficiently for the trip pins 41 to become disengaged from the can. Further movement of the can 10 can then, by forcing apart the trip pins 41, and accordingly, the release members 22 against the action of the spring 48, separate the retaining lugs 28 to release the lid 11 so that the latter can leave the apparatus under gravity. The apertures 32, 37 are dimensioned to accommodate the relative slewing action of the studs 38 during the pivotal movement about the spindles 23.

The trip pins 41 are mounted on the catch members 29 for adjustment forward or backward as desired. To that end they are carried by carrier members 42 which are received in horizontal slots 43 formed in the catch members 29. The carrier members 42 are movable along their respective slots 43 by appropriate manual rotation of captive spindles 44 on which the carrier members are threaded.

The trip pins 41 are so adjusted that the front of the rim 45 of the falling lid 11 becomes engaged in the 90° corner formed at the root of the lever ring 46 of the can, as can be seen in FIG. 1. Further forward movement of the can then allows the lid to fall by pivotal anticlockwise movement at the fulcrum so formed.

The pivoting movement of the lid continues until the lid is horizontal and resting on the can within its opening 9. The lid is then ready to be pressed fully into the opening 9 in sealing engagement with the peripheral rim 47 by a machine (not shown) located at the end of the conveyor belt.

When a can has passed between the trip pins 41 the release members 22 move inwardly under the action of the spring 48 and the catch members 29 fall under gravity, until the studs 38 re-engage the notches 40 in preparation for the next lid.

During the pivotal movement of the lid onto the can, the movement of the back end of the lid is controlled by engagement with a pair of arcuate control bars 50 at its underside and with the lower front edge 33 of the feed member 18 at its upper side. The control thereby effected provides accurate location of the lid in the can opening 9, with little or no tendancy for the lid to bounce, and possibly become displaced, when it comes into full contact with the can. It will be appreciated that in performing this controlling function the bars 50 apply to the lid a forward pressure tending to maintain the location of the lid rim 45 in the corner at the root of the can lever ring 46.

Figure 4:
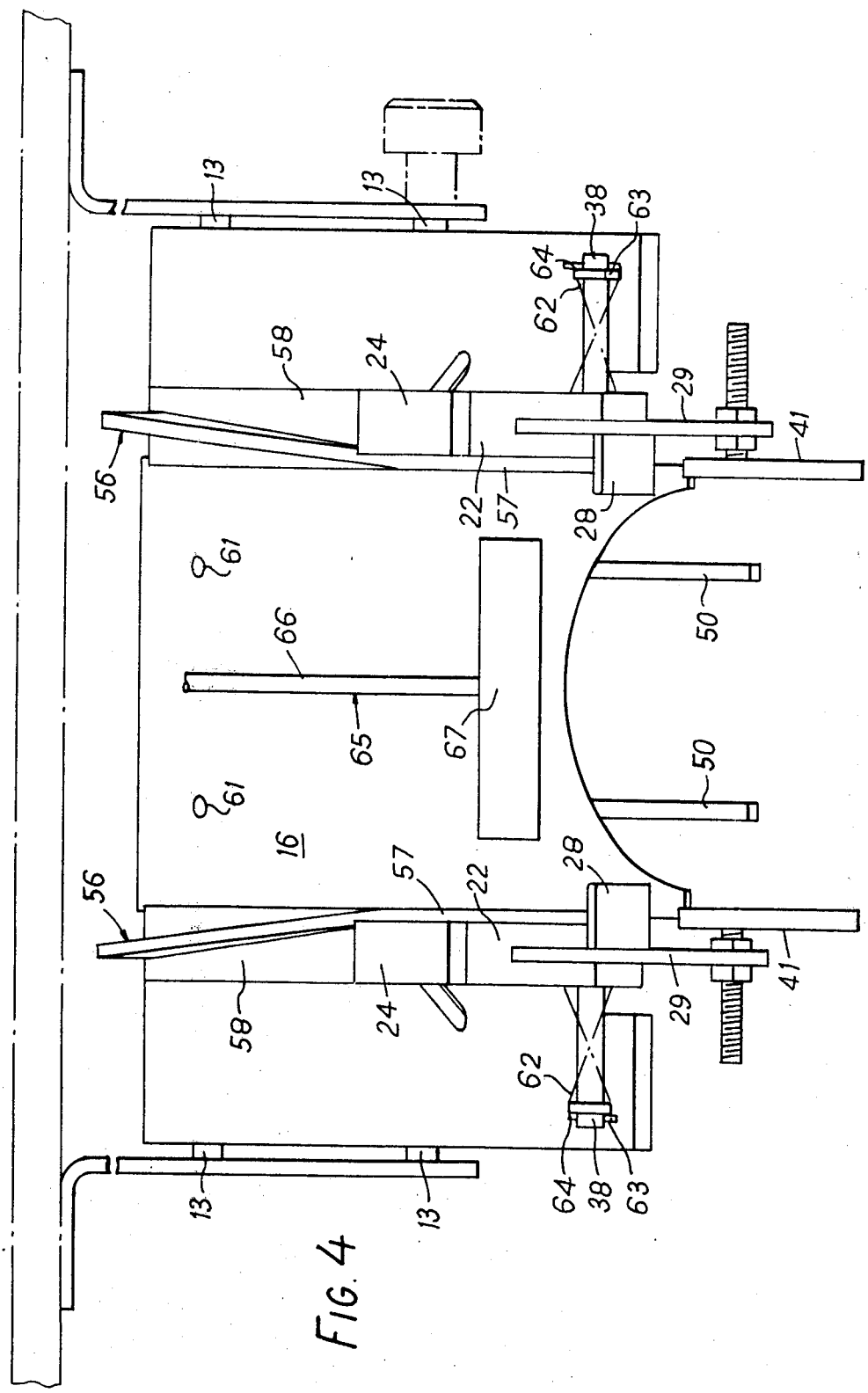
FIG. 4 is a view from above of the modified apparatus.
Figure 5:
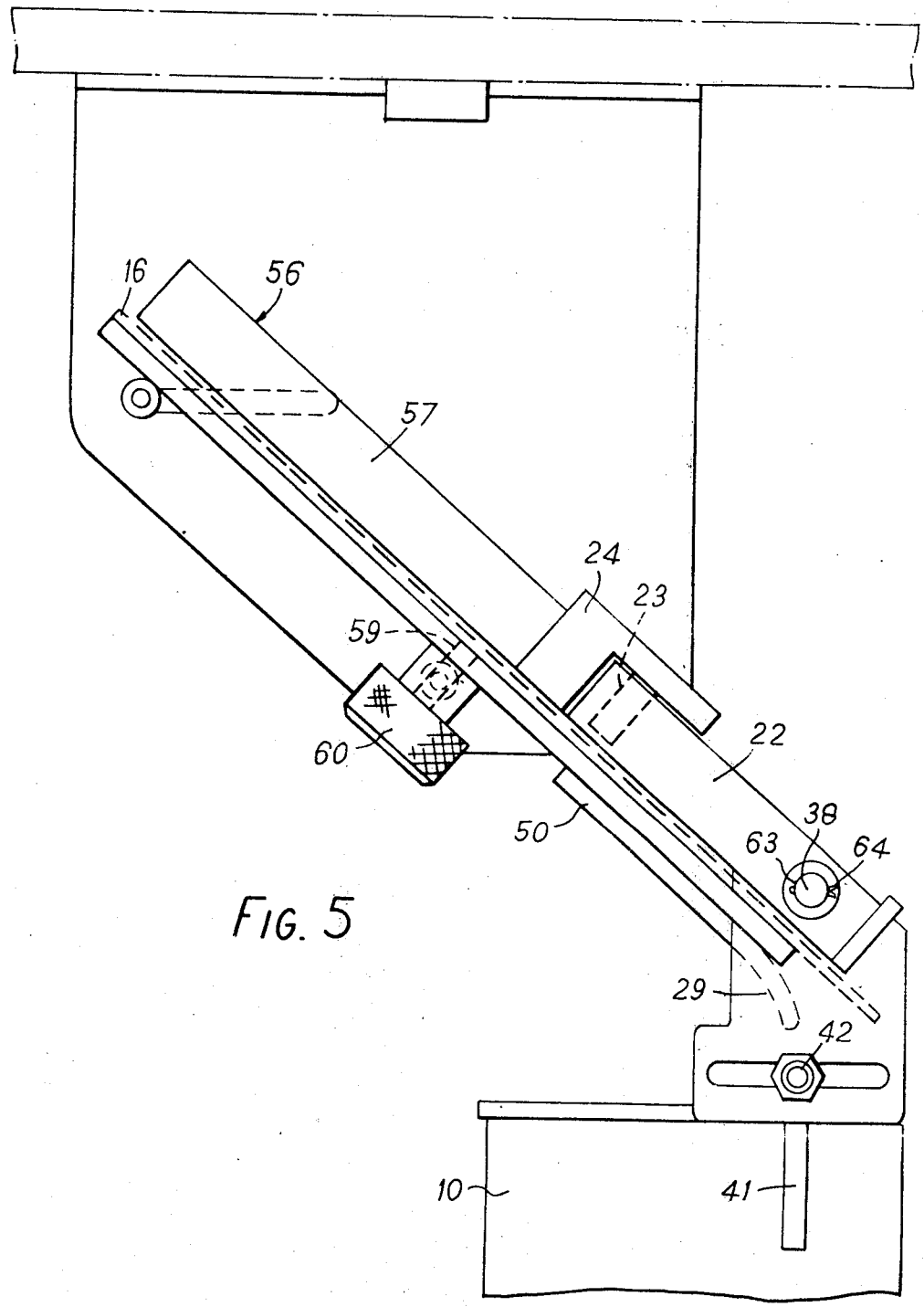
FIG. 5 is a side elevation of the modified apparatus in operation

In the modification shown in FIGS. 4 and 5 the feed member 18 is omitted and the cranked members 24 with the attached release members 22 and catch members 29 are mounted on L-shaped channel members 56 which extend down each side of the plate member 14.

Each channel member 56 has one of its arms vertical and arranged to carry the respective latching stud 38 from its outer face. This vertical arm, which is denoted in the drawings by the reference numeral 57, serves to provide lateral guidance for a lid 10 on the slide member 16. The retaining lug 28 of the associated release member 22 projects inwardly below the bottom end of the arm 57.

The second arms of the channel members 56, denoted by the reference numeral 58, rest on the plate member generally along the outsides of the arms 57. At their bottom faces they carry downwardly extending threaded studs 59 which extend through transversely elongate slots (not shown) in the plate member 14 to engagement by knurled nuts 60.

The slide member 16 is located and retained in position by two downwardly projecting studs 61 engaging correspondingly spaced and dimensioned holes in the plate member 14.

The operation of the modified apparatus of FIGS. 4 and 5 is essentially as previously described. Thus a lid lever 11 for a paint can 10 placed automatically or manually on the slide member 16 is held by the retaining lugs 28 until a paint can lifts the catch members 29 and so allows the release members 22 to pivot apart and so release the lid onto the can.

The modified arrangement has particular advantage over the arrangement of FIGS. 1 to 3 in applications where relatively frequent changes in the size of the can to be lidded are required. The apparatus can readily be adapted for dispensing a different sized lid merely by loosening the nuts 60, moving each channel member 56 across the apparatus by a suitably amount, and retightening the nuts. If necessary the slide member 16 can also be substituted by another such member of appropriate size and likewise provided with studs 61 and/or the trip pins 41 may be adjusted forwards or backwards by rotation of the spindles 44.

In order to make the channel members 56 wholly independent of one another so that they can be handled individually, in the modified arrangement the single tension spring 48 of FIGS. 1 to 3 is replaced by two separate compression springs diagrammatically shown at 62. The springs are mounted on the latching studs 38 and are engaged at their outer ends by washers 63 retained by split pins 64. The arrangement of FIGS. 1 to 3 may itself be modified in this way with advantage.

In order to control the placement of a lid onto an underlying can, the modified arrangement of FIGS. 4 and 5 has two arcuate control bars 50 analogous to those previously described. Movement of the back end of the lid in the upard direction is controlled by a member 65 in the form of an inverted T which is supported at the end of its limb 66 by a suitably mounting (not shown) and which lies above, and in spaced parallel relation to, the slide member 16. The cross arm 67 of this member is suitably located in relation to the control bars 50 so as to perform the same function as the portion 19 of the feed member 18 in the arrangement of FIGS. 1 to 3. In order to cater for different sizes of lids the cross arm 67 is adjustable along the limb 66, or the member 65 as a whole is adjustable in its mounting.

Although of particular application to the location of lids onto filled lever lid paint cans as particularly described, the invention is in no way limited to such an application. It may have general application to the individual superimposition of articles on further articles moving along a predetermined path.

Where as the described embodiment and the modification thereof have two essentially independent control means for controlling the movement of the lids onto the paint cans, one on either side of the lid path, within the scope of the invention are apparatus having only one control means provided.

In the described embodiments the same engagement of the trip pins 41 by a paint can 10 both frees the release members 22 for movement about their spindles 23 and also actuates the release members by pushing them aside against the bias provided by the springs 48 or 62. Thus a single engagement of each control means effects both the unlocking of the control means and the actuation of the control means to effect dispensing. Within the scope of the invention, however, are apparatus wherein the unlocking and actuation of the or each control means requires separate engagement by the article upon which the dispensed article is to be superimposed. In such an arrangement each release member is movable independently of its associated catch means.

I claim:

1. In an apparatus for superimposing a first article upon a second article moving along a predetermined path past the apparatus, the apparatus comprising
   body means defining a holding station for a said first article and an outlet from the said station,
   at least one release member and means mounting said release member on the body means for movement between a first position in which it prevents a said first article at the holding station from leaving the holding station via the outlet, and a second position in which it allows the said first article to leave the holding station under gravity, said mounting means including biasing means for biasing said release member towards said first position and
   a trip means connected to the release member and engageable by a said second article moving along said predetermined path to move the release member from its first position to its second position to free a first article for movement into superimposed relation with a second article, the improvement comprising:
   a catch means operable by a second article and biassed to a locking position in which it locks said release member in its first position and is effective to hold said release member against movement to its second position until such time as the catch means has itself been moved from its locking position by a said second article moving along said predetermined path.

2. Apparatus for placing closures individually on containers moving serially along a generally horizontal path, said apparatus comprising
   body means defining a holding station for a closure and an outlet from the said station,
   at least one release member journalled on the body means for rotation thereon about a generally vertical axis between a first position in which it prevents a said closure at the holding station from leaving the holding station via the outlet and a second position in which it allows the said closure to leave the holding station under gravity, biassing means for biassing said release member into its first position,
   trip means including a catch member mounted on the release member for pivotal movement thereon about a horizontal axis, and
   a latching member fast with the body means, the catch member being biassed by gravity towards engagement with the latching member so as then to lock the release member in its said first position and thereby hold a closure in the holding station, and being arranged and adapted so that engagement by a container moving along said horizontal path will lift said catch member bodily out of engagement with the latching member and may thereafter force the release member to rotate against said biassing means from its first position to its second position whereby to allow a closure to fall under gravity on to the container for subsequent attachment thereto.

3. Apparatus according to claim 2, which includes two of said release members disposed on respective sides of said outlet for holding a said closure in the holding station by engagement with the closure at spaced portions of its periphery, said release members each having a said latching member and catch member associated individually therewith, the catch members being disposed for simultaneous engagement by spaced portions of a container moving along said horizontal path.

4. Apparatus according to claim 3, wherein said biassing means include spring means extending between said release members.

5. Apparatus according to claim 3, wherein said biassing means include respective spring means engaged on the body.

6. Apparatus according to claim 2, which includes two said release members disposed on respective sides of said outlet for holding a closure in the holding station by engagement with the closure at spaced portions of its periphery, said release members each having a said latching member and catch member associated individually therewith, the catch members being disposed for simultaneous engagement by spaced portions of a container moving along said horizontal path, for accommodating the apparatus to differing sizes of closures and containers the release members being releasably mounted on the body means and adjustable towards and away from one another.

7. Apparatus according to claim 1, wherein said release member is pivotable about a first axis between said first position and said second position, and said catch means includes a latching member carried from said body means and a catch member forming part of said trip means and carried by said release member for pivotable movement thereon about a second axis substantially orthogonal to said first axis, said catch member being biassed towards latching engagement with said latching member to lock the release member in its said first position, and being arranged for engagement by a said second article moving along said predetermined path whereby to disengage the said latching member by movement about the said second axis, and thereafter to force said release member against the bias thereof to the said second position thereof.

* * * * *